US006888059B2

(12) United States Patent
Murata et al.

(10) Patent No.: US 6,888,059 B2
(45) Date of Patent: May 3, 2005

(54) PHOTOTHERMAL POWER GENERATION DEVICE AND METHOD

(75) Inventors: Kiyohito Murata, Susono (JP); Hideki Nakayama, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 294 days.

(21) Appl. No.: 10/202,680

(22) Filed: Jul. 25, 2002

(65) Prior Publication Data

US 2003/0066290 A1 Apr. 10, 2003

(30) Foreign Application Priority Data

Jul. 27, 2001 (JP) .................................. 2001-228133

(51) Int. Cl.$^7$ ............................................. H01L 31/058
(52) U.S. Cl. ...................... 136/253; 310/303; 310/306; 431/100
(58) Field of Search .......................... 136/253; 310/303, 310/306; 431/100

(56) References Cited

U.S. PATENT DOCUMENTS

| | | | | | |
|---|---|---|---|---|---|
| 4,707,560 | A | * | 11/1987 | Hottel et al. ................. | 136/253 |
| 4,778,378 | A | * | 10/1988 | Dolnick et al. ............... | 431/79 |
| 5,383,976 | A | | 1/1995 | Fraas et al. | |
| 5,439,532 | A | | 8/1995 | Fraas | |
| 5,512,109 | A | | 4/1996 | Fraas | |
| 5,551,992 | A | | 9/1996 | Fraas | |
| 5,593,509 | A | * | 1/1997 | Zuppero et al. ............ | 136/253 |
| 5,932,885 | A | | 8/1999 | DeBellis et al. | |
| 5,942,047 | A | * | 8/1999 | Fraas et al. ................. | 136/253 |
| 6,204,442 | B1 | | 3/2001 | Laqua | |
| 6,218,607 | B1 | * | 4/2001 | Mulligan et al. ........... | 136/253 |
| 6,235,983 | B1 | | 5/2001 | Becker et al. | |
| 6,337,437 | B1 | * | 1/2002 | Fraas et al. ................. | 136/253 |
| 6,486,392 | B1 | | 11/2002 | Samaras et al. | |
| 6,686,534 | B2 | * | 2/2004 | Chen ......................... | 136/253 |
| 6,713,774 | B2 | * | 3/2004 | DeSteese et al. ........ | 250/505.1 |
| 2002/0148498 | A1 | | 10/2002 | Nakayama et al. | |
| 2002/0153035 | A1 | | 10/2002 | Nakayama et al. | |
| 2003/0044331 | A1 | * | 3/2003 | DeBellis et al. ............ | 422/198 |
| 2003/0230336 | A1 | | 12/2003 | Malfa et al. | |
| 2004/0118450 | A1 | * | 6/2004 | Murata et al. ............. | 136/253 |
| 2004/0244830 | A1 | * | 12/2004 | Hokoi et al. ............... | 136/253 |

FOREIGN PATENT DOCUMENTS

| | | |
|---|---|---|
| JP | 63-316486 | 12/1988 |
| JP | 2000-68545 | 3/2000 |
| JP | 2000-106001 | 4/2000 |
| JP | 2000-106452 | 4/2000 |

OTHER PUBLICATIONS

1997 Social Development System Planning Project Report, "Research & Development on Organization of Environment–Conscious High Efficiency Power Generator for Next Generation," *Engineering Advancement Association of Japan*, pp. 31–49, Mar. 1998, Single page Concise Explanation.

* cited by examiner

Primary Examiner—Alan Diamond
(74) Attorney, Agent, or Firm—Finnegan, Henderson, Farabow, Garrett & Dunner, LLP (57) ABSTRACT

A photothermal power generation device designed to heat an emitter receives a supply of fuel and air, burns the fuel to produce combustion gas, and converts light emitted from the emitter into electric power by means of a photoelectric conversion element. The device is provided with a flow resistance adjusting unit for adjusting a flow resistance of the combustion gas in the emitter in accordance with a state of combustion gas, a combustor fire vent adjusting unit for adjusting the shapes of, or a number of, fire vents formed in the combustor in accordance with a required output, or a discharge state adjusting unit for adjusting a discharge state of exhaust gas in accordance with a state of the combustion gas. This photothermal power generation device provides uniform light-emitting intensity and enhances power generation efficiency.

14 Claims, 10 Drawing Sheets

PHOTOTHERMAL POWER GENERATION DEVICE AND METHOD

INCORPORATION BY REFERENCE

The disclosure of Japanese Patent Application No. 2001-228133 filed on Jul. 27, 2001, including the specification, drawings, and abstract is incorporated herein by reference in its entirety.

BACKGROUND OF THE INVENTION

1. Field of the Invention

The invention relates to a photothermal power generation device (TPV system) and method for generating power through thermophotovoltaic energy conversion for converting infrared rays (referred to as infrared radiation or heat rays as well) into electric power by means of a photoelectric conversion element (a photoelectric conversion cell).

2. Description of the Related Art

In a photothermal power generation device, an emitter is heated and emits infrared rays of a certain wavelength. The infrared rays impinge on a photoelectric conversion element and are converted into electric power. The photothermal power generation device has no movable portion and thus can realize a low level noise, low level oscillation system.

As an energy source in the forthcoming generation, photothermal power generation is advantageous in terms of cleanliness, silence, and the like. Combustion heat, solar heat, nuclear decay heat, or the like can be utilized to heat emitters. In general, however, combustion gas produced by burning a gaseous fuel such as butane is utilized to heat emitters.

In one known example, a photothermal power generation device is composed of an emitter made from a porous solid substance, emitter heating means designed to allow combustion gas to flow through the emitter, and a photoelectric conversion element for converting energy emitted from the emitter into electric energy.

In the above-described example, high-temperature combustion gas produced in a combustor (burner) flows through the emitter to heat it. However, combustion gas is dispersed unevenly when flowing through the emitter. This leads to uneven dispersion of rays of light emitted from the emitter. Such uneven dispersion is attributable to inadequate distribution of flame-rising portions in the combustor, incompatibility with the flow resistance in the emitter, changes in operational circumstances (the state of passage of combustion gas through the emitter changes depending on how a combustion chamber changes in response to a change in required power generation amount), and the like.

In the case where light is emitted from the emitter unevenly, the amount of incident energy differs among a plurality of photoelectric conversion cells for receiving light. For this reason, the power generation amount differs among these photoelectric conversion cells. As a result, the current value also differs among them, just as the power generation amount differs among them. Further, since the photoelectric conversion cells are generally connected in series, the total power generation amount is determined by a formula "the sum of voltages generated by the cells"ב"the current flowing through the cell with the minimum power generation amount". Thus, the current flowing through the cell with the minimum power generation amount has a low intensity if the degree of dispersion is sizable. As a result, a drop in power conversion efficiency occurs and causes a problem.

SUMMARY OF THE INVENTION

The invention has been made as a solution to the aforementioned problem. It is an object of the invention to provide a photothermal power generation device that achieves enhancement of the power generation efficiency by ensuring a uniform light-emitting intensity in an emitter.

To achieve the aforementioned object, the invention provides a photothermal power generation device comprising a combustor, an emitter, a photoelectric conversion element, and a flow resistance adjusting unit. The combustor receives a supply of fuel and air, burns fuel, and produces combustion gas. The emitter is heated by allowing combustion gas produced in the combustor to flow through a combustion gas flow passage. The photoelectric conversion element receives light emitted from the emitter and converts it into electric power. The flow resistance adjusting unit adjusts a resistance in the combustion gas flow passage of the emitter in accordance with a state of the combustion gas.

While some portions of an emitter with a uniform thickness are likely to be heated, the other portions are unlikely to be heated. Such a difference in susceptibility to heat depends on how those portions are located in relation to flames to be formed. In the case of the photothermal power generation device constructed as described above, since the resistance in the combustion gas flow passage of the emitter can be adjusted in accordance with a state of combustion gas, temperatures can be distributed uniformly in the emitter.

Further, according to another aspect of the invention, a photothermal power generation device comprising a combustor, an emitter, a photoelectric conversion element, and a combustor fire vent adjusting unit is provided. The combustor receives a supply of fuel and air, burns fuel, and produces combustion gas. The emitter is heated by allowing combustion gas produced in the combustor to flow through a combustion gas flow passage. The photoelectric conversion element receives light emitted from the emitter and converts it into electric power. The combustor fire vent adjusting unit adjusts the shape or number of fire vents formed in the combustor in accordance with a required output of power generation.

The shape of flames changes depending on the shape or number of the fire vents formed in the combustor. In the photothermal power generation device constructed as described above, the fire vents are reduced in size or number to form long flames when low outputs are required, whereas the fire vents are increased in size or number to form flames of a suitable length when high outputs are required. By taking such a measure as an example, the combustion state in the combustor is controlled optimally in accordance with a required (target) output. As a result, the emitter can be heated uniformly as a whole.

Further, according to still another aspect of the invention, a photothermal power generation device comprising a combustor, an emitter, a photoelectric conversion element, and a discharge state adjusting unit is provided. The combustor receives supplies of fuel and air, burns fuel, and produces combustion gas. The emitter is heated by allowing combustion gas produced in the combustor to flow through a combustion gas flow passage. The photoelectric conversion element receives light emitted from the emitter and converts it into electric power. The discharge state adjusting unit adjusts a discharge state of exhaust gas on the basis of a state of the combustion gas.

In the photothermal power generation device constructed as described above, exhaust gas obtained after combustion gas has flown through the emitter is controlled optimally, whereby it becomes possible to ensure uniform distribution of combustion gas in the emitter. The optimization of combustion can also be achieved by controlling an air-fuel ratio, that is, a ratio of air to fuel.

BRIEF DESCRIPTION OF THE DRAWINGS

The above-mentioned and other objects, features, advantages, technical and industrial significance of this invention will be better understood by reading the following detailed description of a preferred embodiment of the invention, when considered in connection with the accompanying drawings.

DETAILED DESCRIPTION OF PREFERRED EMBODIMENTS

In the following description and the accompanying drawings, the invention will be described in more detail with reference to presently preferred embodiments.

Figure 1:
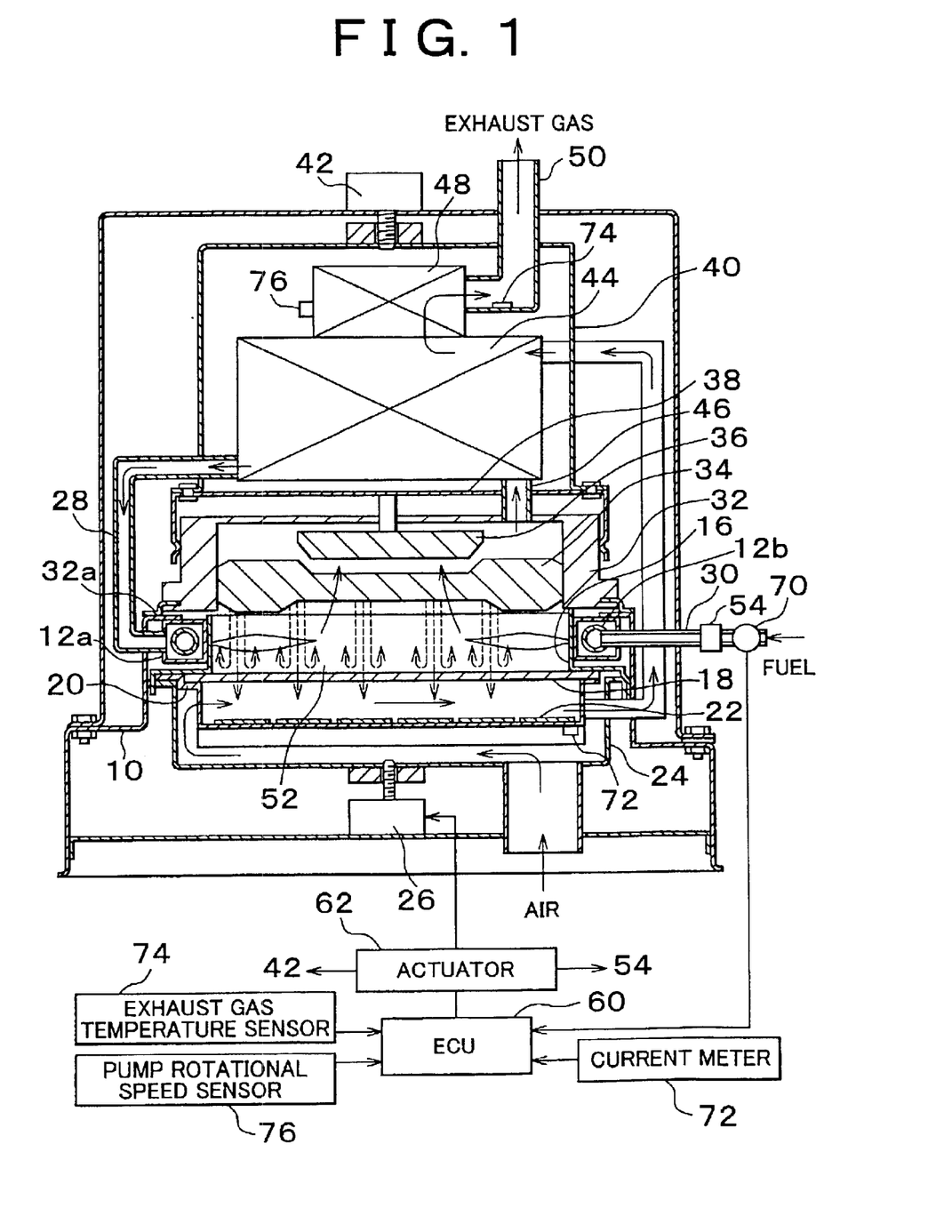
FIG. 1 is a cross-sectional view of the construction of a photothermal power generation device according to an exemplary embodiment of the invention.

FIG. 1 is a cross-sectional view of the construction of a photothermal power generation device according to one embodiment of the invention. A base frame 10 is shown in FIG. 1. An air pipe 12a fixed to the base frame 10 by welding or the like and a fuel gas supply pipe 12b disposed inside the air pipe 12a are integrated with each other to constitute a combustor 12 (see FIGS. 5A and 5B). As is apparent from a detailed view of the combustor 12 shown in FIGS. 5A and 5B, a fuel gas blowout port 12c from which fuel gas is blown out is disposed in the fuel gas supply pipe 12b. Fire vents are disposed at predetermined intervals in the combustor 12. The mixture of fuel gas blown out from the fuel gas blowout port 12c and air supplied to the combustor 12 is blown out from the fire vents horizontally inwardly.

A plate 16 adjusts the fire vents of the combustor 12. An optical selection filter 18 is disposed below the combustor 12. A plurality of photoelectric conversion cells 22 are installed in a cell holding plate 20, which is disposed below the optical selection filter 18. A cell cover member 24 has an air introduction port. The plate 16 for adjusting the fire vents of the combustor 12, the optical selection filter 18, the cell holding plate 20, the photoelectric conversion cell 22, and the cell cover member 24 are integrated with one another to constitute a lower mobile member. This lower mobile member can be moved vertically by a combustor control motor 26, which is constructed of a stepping motor.

A pipe line 28 for supplying high-temperature air that has undergone heat exchange communicates with the air pipe 12a of the combustor 12. A fuel pipe line 30 equipped with a fuel gas flow rate control valve 54 communicates with the fuel gas supply pipe 12b of the combustor 12. A structural member 32 is made from a material exhibiting excellent heat insulation properties and good airtightness, for example, from ceramic. The structural member 32 is integrated at its end 32a with the base frame 10 by an auxiliary member.

The structural member 32 holds an emitter body 34 made from a porous material. An auxiliary control emitter 36 is disposed above the emitter body 34. The auxiliary control emitter 36 is integrated with frame members 38, 40 and can be moved vertically by an emitter control motor 42, which is constructed of a stepping motor.

A heat exchanger 44 communicates with an upper portion of the emitter body 34 via a communication pipe 46. Exhaust gas fanned by an exhaust fan 48 is discharged to the outside through a chimney 50.

An electronic control unit (ECU) 60 is disposed to control the photothermal power generation device. The ECU 60 controls the fuel gas flow rate control valve 54, the emitter control motor 42, the combustor control motor 26, and the like by means of various control actuators 62. To control these components, signals from a fuel gas flow rate meter 70 disposed in the fuel pipe line 30, a current meter 72 for measuring output current of the photoelectric conversion cell 22, an exhaust gas temperature sensor 74 for measuring temperature of exhaust gas, a pump rotational speed sensor 76 for measuring rotational speed of a pump in the exhaust fan 48, and the like are input to the ECU 60.

It will now be described how the aforementioned construction operates. Fuel is supplied from the fuel pipe line 30 to the fuel gas supply line 12b of the combustor 12. Air that has been introduced from the outside via an air introduction port formed in the cell cover member 24 flows through a space below the cell holding plate 20 and a space above the photoelectric conversion cell 22 to cool the photoelectric conversion cell 22, and then is supplied to the air pipe 12a of the combustor 12 through the heat exchanger 44. Air and fuel are mixed in the combustor 12. If the mixture of air and fuel is ignited in the vicinity of a fire vent 12d of the combustor 12 by an igniter (not shown), combustion occurs in a combustion chamber 52 formed between the emitter body 34 and the optical selection filter 18. Combustion gas produced through combustion flows through the emitter 34 designed as a porous body. In the meantime, heat is conveyed from high-temperature combustion gas to the emitter body 34. As a result, the emitter body 34 is heated up to a high temperature and emits light.

Some rays of light emitted from the emitter body 34 have wavelengths unsuited for power generation. These rays are reflected by the optical selection filter 18, return to the emitter 34, are reabsorbed thereby, and heat the emitter body 34. Thus, these rays are utilized to emit light suited for power generation. On the other hand, those rays of light emitted from the emitter body 34 which have wavelengths suited for power generation travel through the optical selection filter 18, reach the photoelectric conversion cell 22, and are converted into electric power.

Combustion gas that has flown through the emitter body 34 is introduced into the heat exchanger 44 through the communication pipe 46, delivers heat to air for combustion, flows through the exhaust fan 48, and is discharged from the chimney 50. Thus, air introduced into the air pipe 12a of the combustor absorbs thermal energy of exhaust gas and reaches a high temperature as a result. By recovering heat of the air introduced into the air pipe 12a of the combustor, the power generation efficiency is enhanced.

Figure 2A:
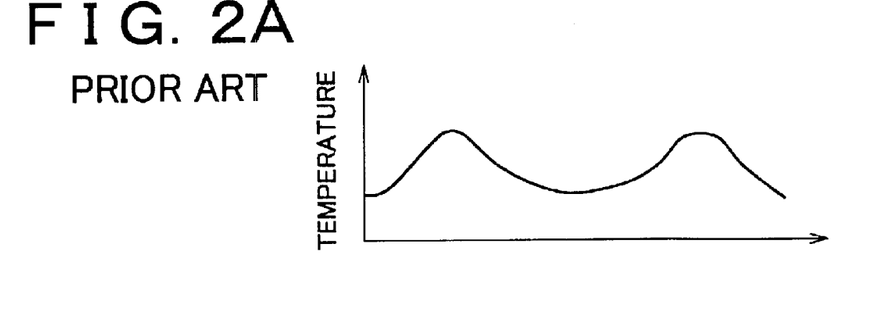
FIGS. 2A to 2C are schematic views for explaining how an emitter is heated according to the related art.
Figure 2B:
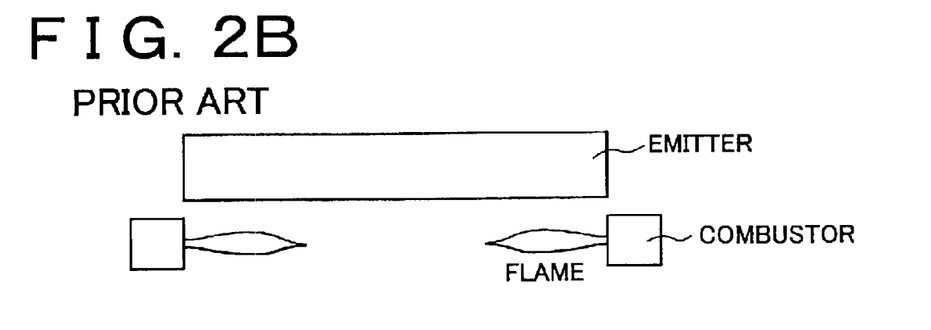
Figure 2C:
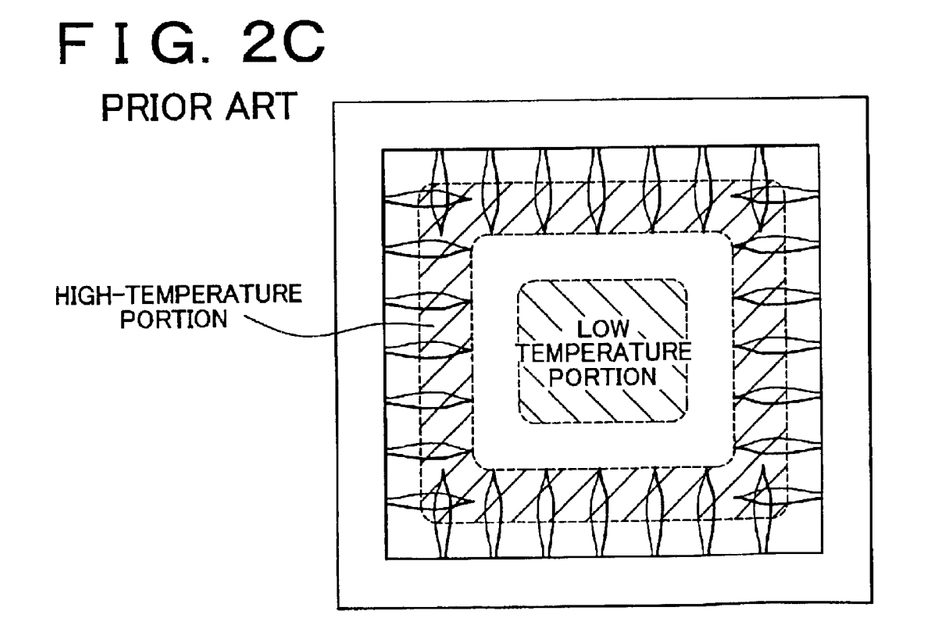

A problem caused by a photothermal power generation device according to the related art will now be described. FIGS. 2A to 2C are views for explaining how an emitter is heated according to the related art. As is shown schematically in a cross-sectional view of FIG. 2B, an emitter having a uniform thickness is heated. In this case, those portions of the emitter which are close to flames rising from a combustor are heated sufficiently and reach high temperatures, whereas the other portions reach lower temperatures. That is, temperatures in the cross-section of the emitter are distributed as shown in FIG. 2A. As is apparent from a bottom view of FIG. 2C, a high-temperature portion and a low-temperature portion are formed in the emitter.

Figure 3:
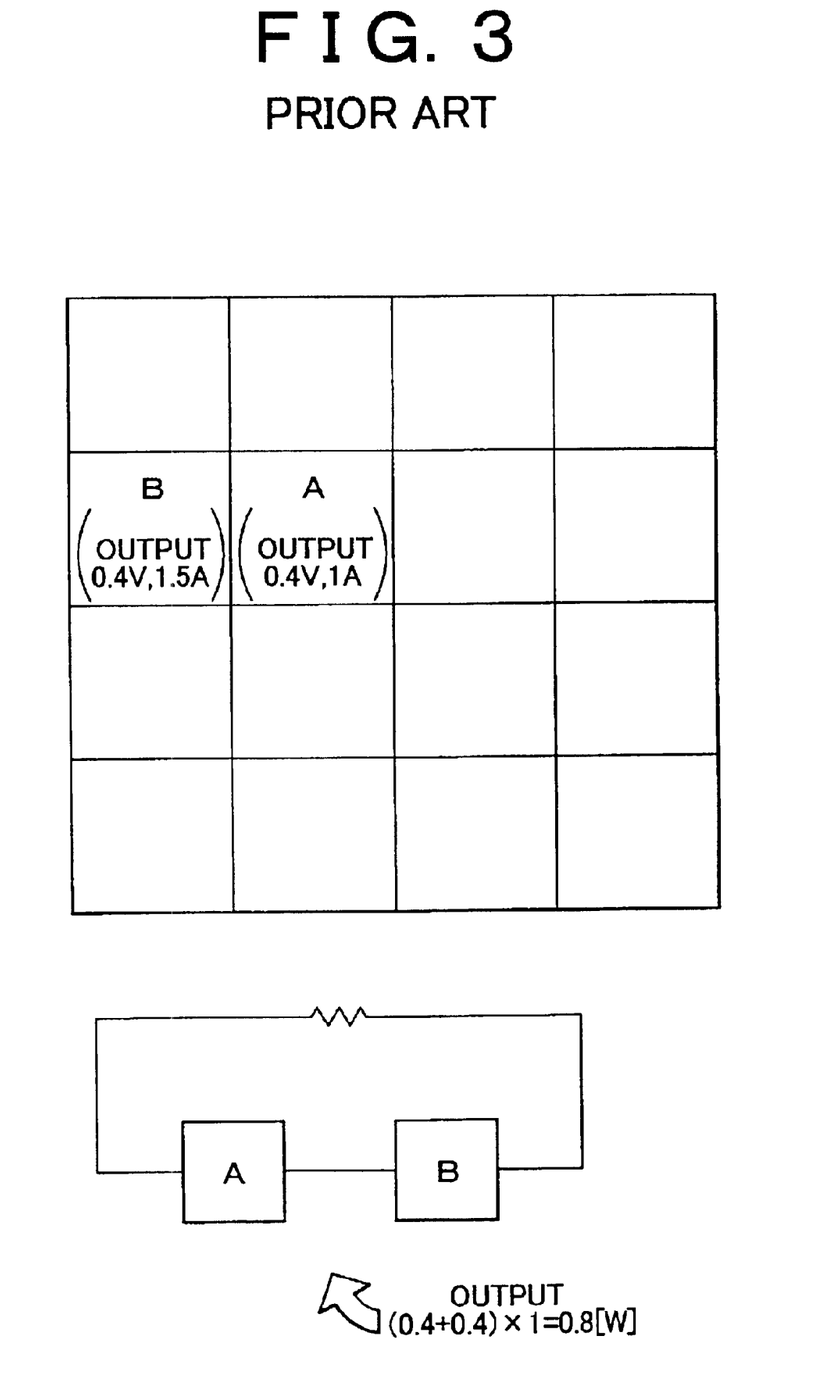
FIG. 3 is a schematic view of a state in which 16 photoelectric conversion cells are disposed in such a manner as to correspond to the emitter according the related art shown in FIGS. 2A to 2C.

Thus, if a plurality of photoelectric conversion cells, for example, 16 photoelectric conversion cells are disposed in such a manner as to correspond to the emitter shown in FIGS. 2A to 2C as shown in a plan view of FIG. 3, a cell B corresponding to the high-temperature portion of the emitter outputs a current of higher intensity than a cell A corresponding to the low-temperature portion of the emitter. For example, while the current output from the cell A is 1A, the current output from the cell B is 1.5A. If the cell A and the cell B are connected in series on the ground that the photothermal power generation device is desired to have a single output, the output obtained does not exceed 0.4V× 1A+0.4V×1A=0.8W due to a restriction resulting from the current flowing through the cell A, although an output of e.g. 0.4V×1A+0.4V×1.5A=1W is to be obtained intrinsically.

To solve this problem, the emitter 34 according to the embodiment shown in FIG. 1 has been ingeniously contrived as follows. That is, the emitter 34 has a central portion with a reduced thickness so as to ensure a reduced gas flow resistance. As a result, a large amount of combustion gas flows through the central portion as well, which is far from the flames. Thus, temperatures are distributed uniformly in the emitter 34. However, since the shape of the flames changes depending on the required output, such a contrivance alone cannot bring about a satisfactory solution. Thus, as shown in FIG. 1, the emitter 34 adopts a variable emitter structure equipped with the auxiliary control emitter 36.

Figure 4A:
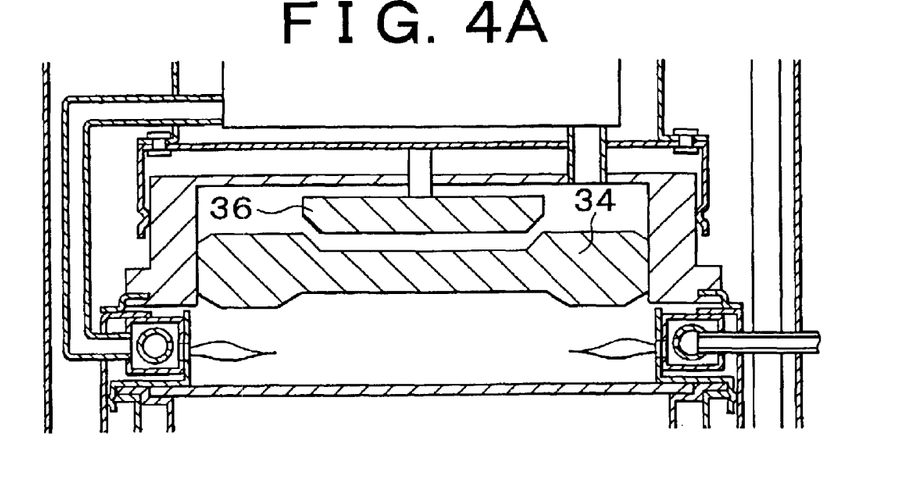
FIGS. 4A to 4C are views for explaining how an auxiliary-control emitter of the photothermal power generation device according to the embodiment of the invention operates.
Figure 4B:
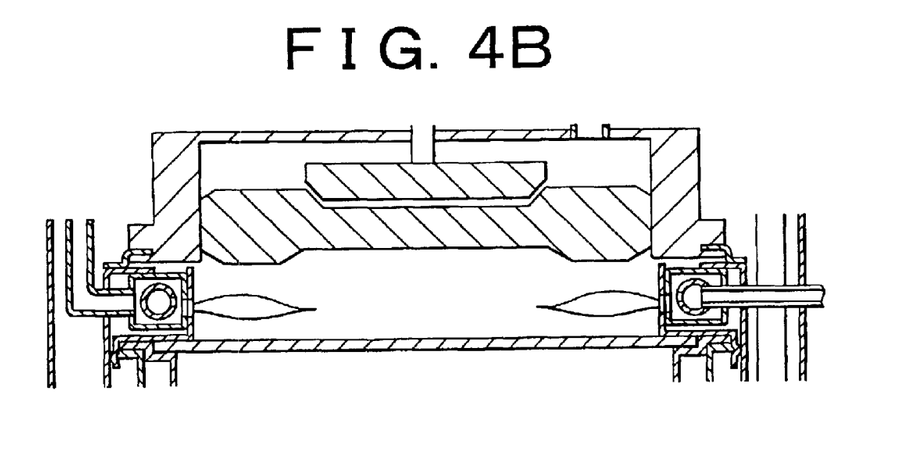
Figure 4C:
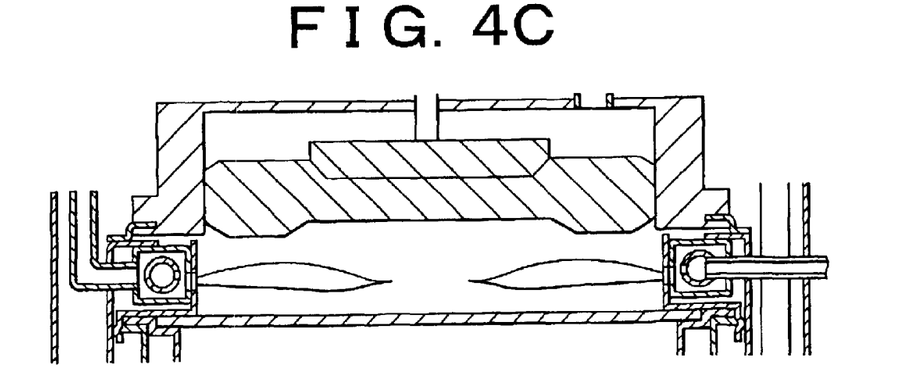

That is, according to the embodiment shown in FIG. 1, the gas flow resistance of the emitter designed as a light-emitting portion is variable depending on the amount of combustion gas. More specifically, the auxiliary control emitter 36 moves vertically as shown in FIGS. 4A to 4C, whereby the polar member to be made into the emitter is changed in thickness. As a result, the emitter has a variable gas flow resistance.

As described above, the central portion of the emitter body 34 is reduced in thickness. Therefore, in the case of low outputs with low frames, an outer peripheral portion of the emitter body 34 tends to rise in temperature. The auxiliary control emitter 36 is thus installed in an upper region as shown in FIG. 4A so as not to constitute a flow resistance.

On the other hand, in the case of intermediate outputs, the flames are close to the central portion. Therefore, the amount of combustion gas flowing through the central portion is increased, and the temperature of the central portion tends to be higher as compared with the case of low outputs. In the case of intermediate outputs, the auxiliary control emitter 36 is moved downwards as shown in FIG. 4B, whereby the flow resistance is increased. As a result, good balance is maintained.

Furthermore, in the case of high outputs, the flames almost reach the central portion. Thus, in order to further increase the flow resistance of the central portion, the auxiliary control emitter 36 is moved downwards to the lowest position as shown in FIG. 4C.

Figure 5A:
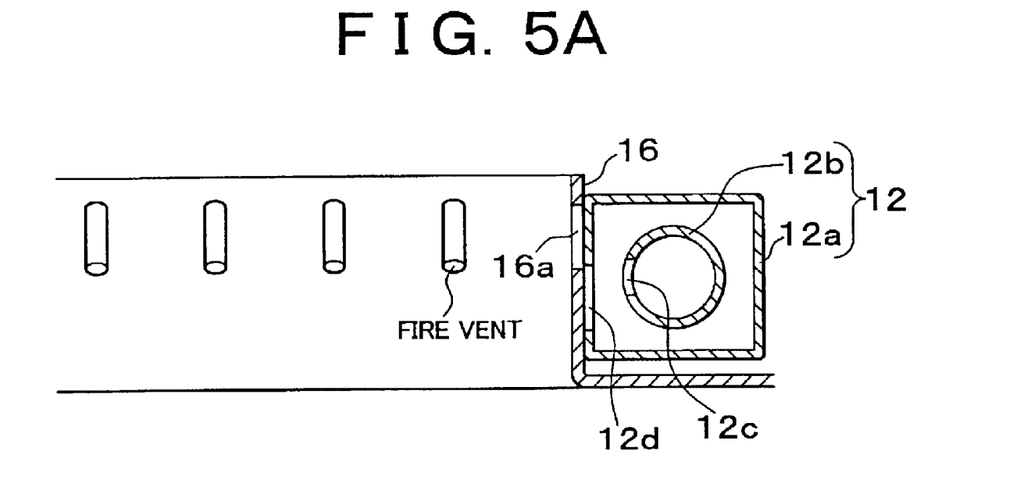
FIGS. 5A and 5B are views for explaining how fire vents of a combustion portion of the photothermal power generation device according to the embodiment of the invention change in shape.
Figure 5B:
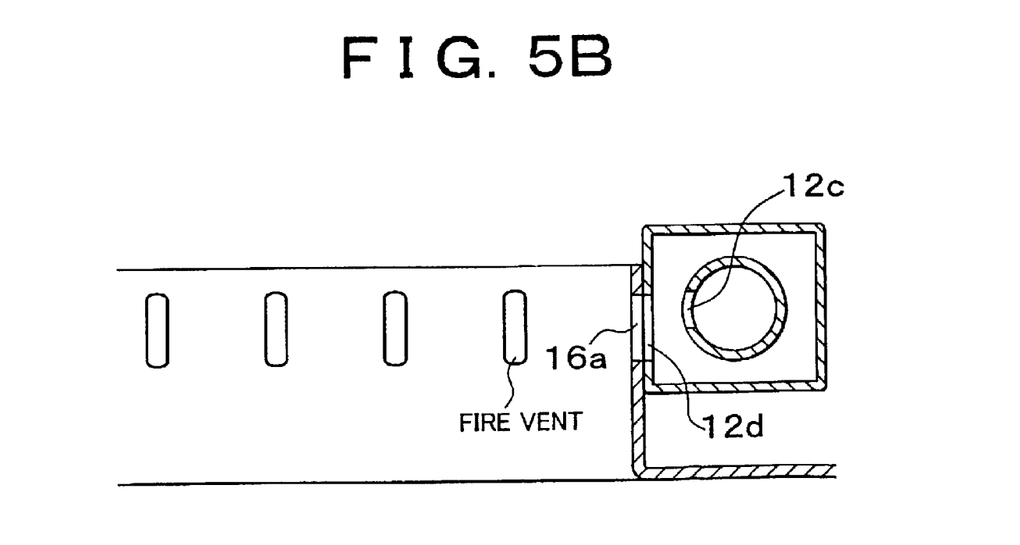

Further, the embodiment shown in FIG. 1 is designed such that a uniform light-emitting intensity can be obtained in the emitter by making it possible to adjust the shape of the fire vents of the combustor in accordance with the amount of combustion gas. FIGS. 5A and 5B are views for explaining how the shape of the fire vents of a combustion portion changes. As described above, the plate 16 for adjusting the fire vents of the combustor can be moved vertically by the combustor control motor 26. Therefore, as shown in FIGS. 5A and 5B, the plate 16 changes in position with respect to the combustor 12, which is composed of the air pipe 12a and the fuel gas supply pipe 12b.

If the plate 16 for adjusting the fire vents of the combustor changes in position, the overlapping area of the fire vent 12d formed in the air pipe 12a and a fire vent 16a formed in the plate 16 changes, whereby the fire vents change in shape. As a result, the flames change in dimension.

Hence, the fire vents are reduced in size to form long flames in the case of low outputs, whereas the fire vents are increased in size to form flames of a suitable length in the case of high outputs. By thus controlling the shape of the flames, it becomes possible to heat the emitter uniformly. It is also appropriate to control the number of fire vents on the basis of a similar principle.

In the embodiment shown in FIG. 1, the exhaust fan 48 designed as a controllable exhaust suction pump is disposed on the exhaust side to optimize the amount of exhaust gas in accordance with the amount of combustion gas. The exhaust fan 48 is operated in a mode suited for a temperature of exhaust gas. This also serves to obtain a uniform light-emitting intensity in the emitter.

In the photothermal power generation device according to the related art, an air introduction pump is disposed on the air-supply side. In this case, however, the device employing an emitter constructed of a porous body is inconvenient because a trap can be created in a gas flow passage. This inconvenience has a great influence on the distribution of gas flow in the emitter.

Thus, the embodiment shown in FIG. 1 is designed such that the exhaust fan 48 is disposed on the exhaust side, whereby combustion gas is prevented from being biased due to an emitter passage resistance in a combustion chamber at an inlet of the emitter. As a result, good combustion is achieved and flame formation can be controlled easily.

It is to be noted, however, that the amount of exhaust gas flowing from the exhaust fan 48 fluctuates depending on the exhaust gas temperature. Therefore, this embodiment is designed to measure an exhaust gas temperature and a fuel supply amount, calculate a theoretical exhaust gas amount on the basis of the measured values, determine an exhaust fan output such that the exhaust gas amount becomes equal to the theoretical exhaust gas amount, and control the exhaust fan.

Figure 6:
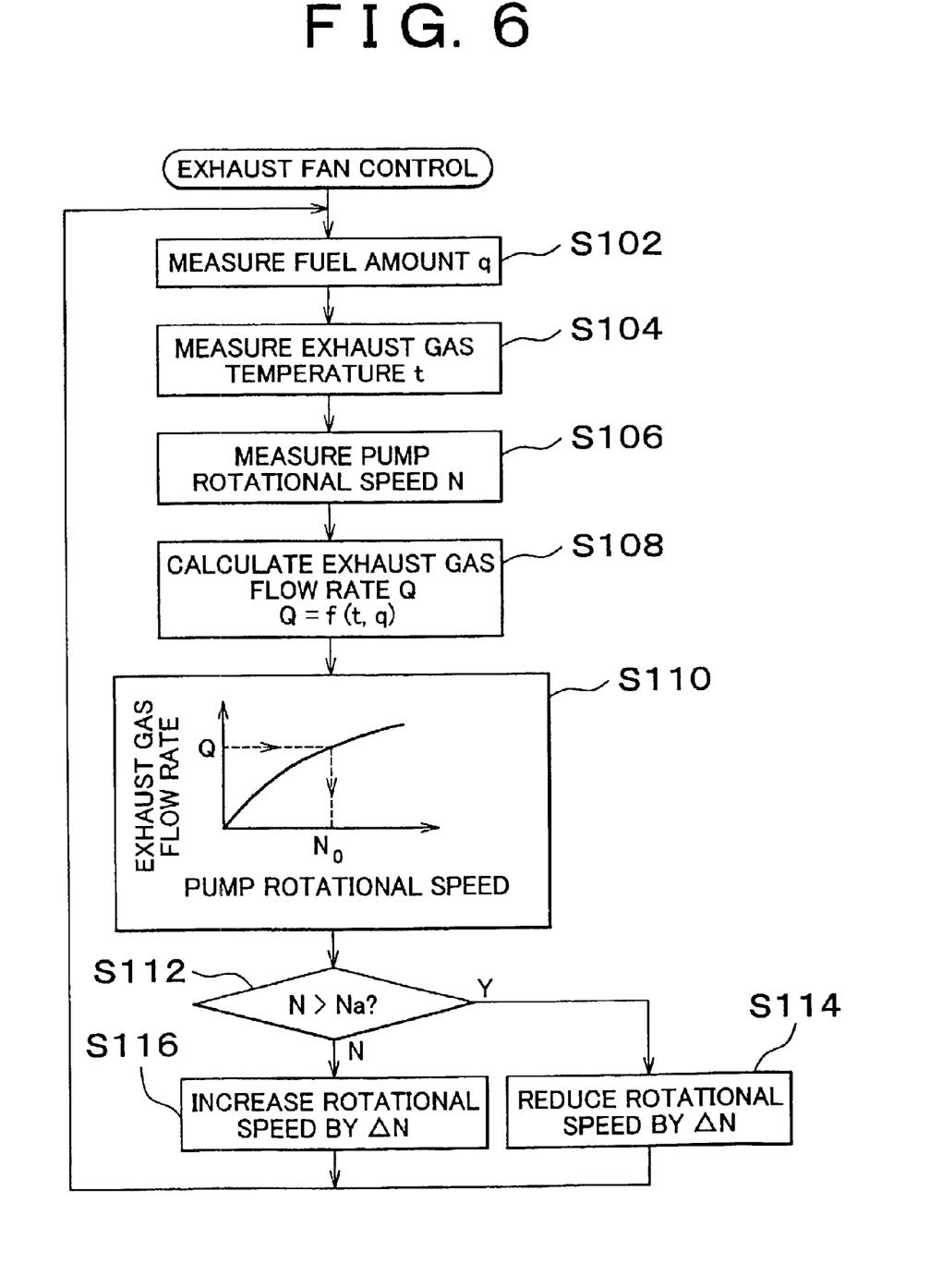
FIG. 6 is a flowchart showing procedures of controlling an exhaust fan of the photothermal power generation device according to the embodiment of the invention.

A flowchart in FIG. 6 shows concrete procedures of controlling the exhaust fan by means of the ECU 60. First of all, the fuel gas flow rate meter 70 measures a fuel supply amount q in step S102. The exhaust gas temperature sensor 74 then measures an exhaust gas temperature t in step S104. The pump rotational speed sensor 76 then measures a pump rotational speed N of the exhaust gas 48 in step S106.

An exhaust gas flow rate Q is then calculated theoretically in step S108 on the basis of the measured exhaust gas temperature t and the measured fuel supply amount q. A target value No of pump rotational speed for achieving the calculated exhaust gas flow rate Q is then determined in step S110 by referring to a predetermined map.

The measured pump rotational speed N and the target value No are then compared with each other in step S112. If N>No, the rotational speed is controlled in step S114 so as to be reduced by a predetermined value $\Delta N$. On the other hand, if $N \leq No$, the rotational speed is controlled in step S116 so as to be increased by the predetermined value $\Delta N$. After the processing in step S114 or step S116 has been performed, the processing in step S102 is performed again.

It has been described hereinbefore how control objects such as the emitter, the combustor, and the exhaust fan are controlled separately. As a matter of course, a certain effect can be achieved by controlling any one of these control objects separately. However, power can be generated more efficiently by performing integrated control of at least two of these control objects. Finally, a description will be made as to a control method in which the emitter conditions are always optimized by performing integrated control of all the control objects, that is, the emitter, the combustor, and the exhaust fan.

Figure 7:
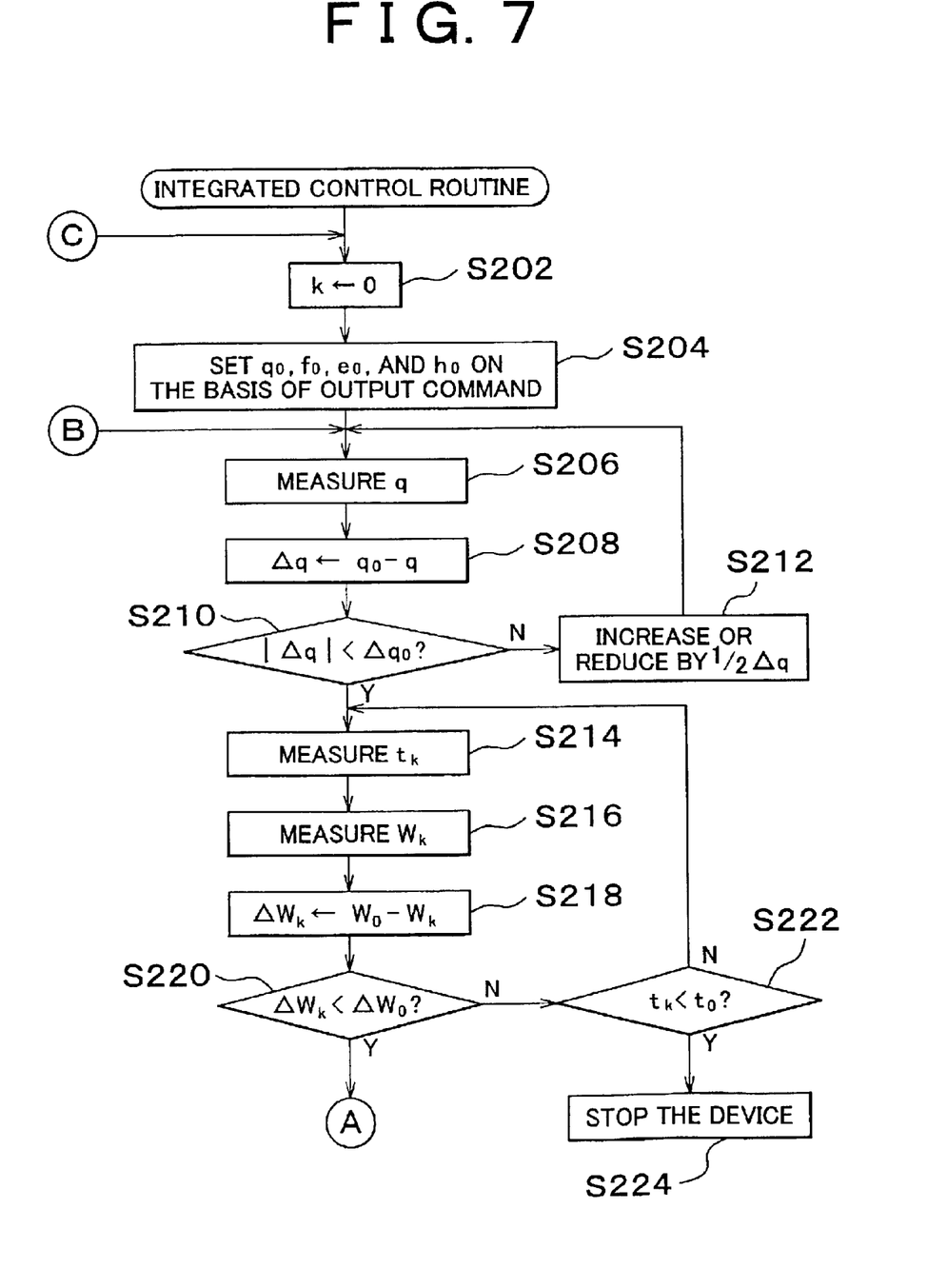
FIG. 7 is a flowchart showing procedures of integrated control of the photothermal power generation device according to the embodiment of the invention.
Figure 8:
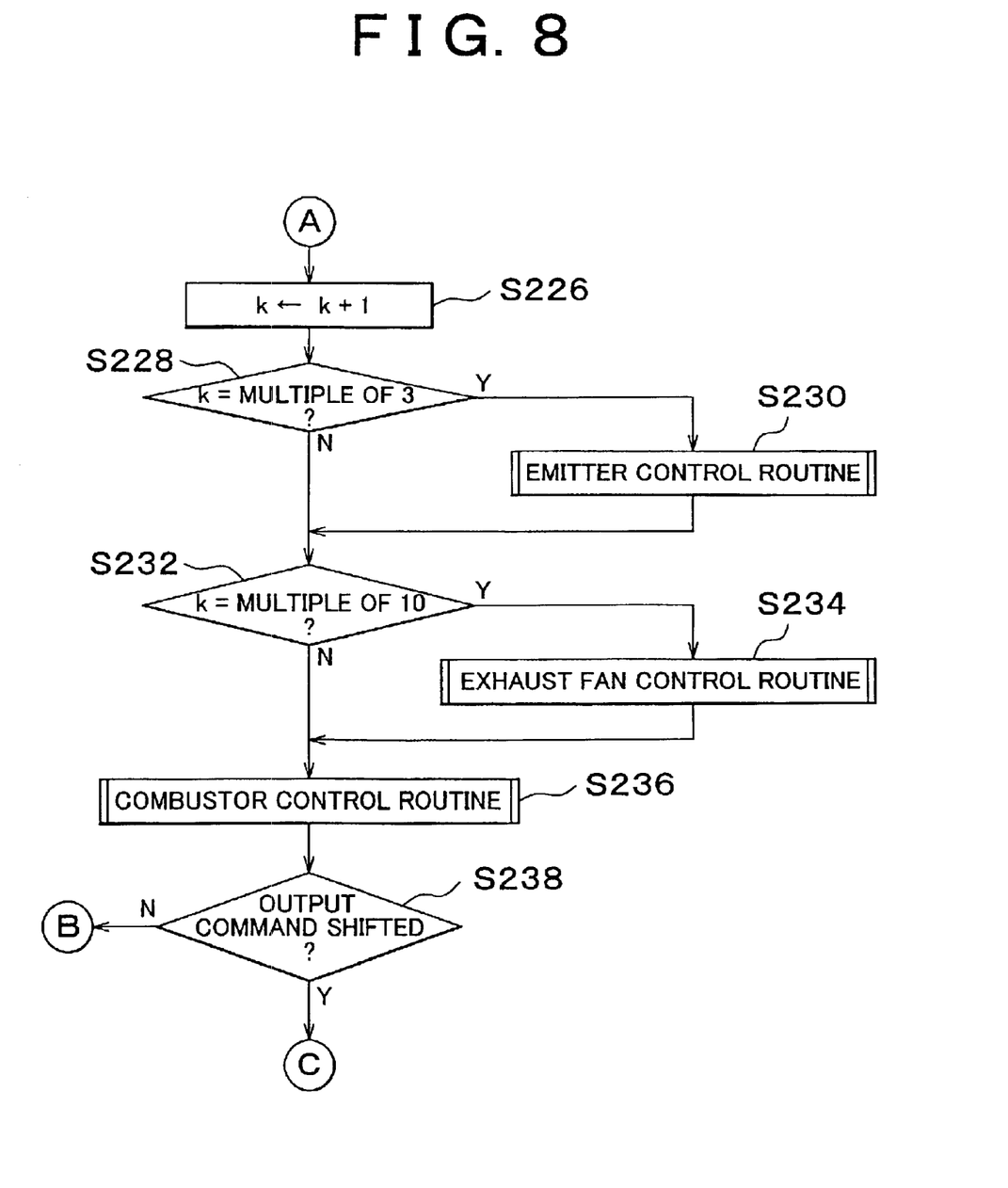
FIG. 8 is a flowchart showing procedures of integrated control of the photothermal power generation device according to the embodiment of the invention.

FIGS. 7 and 8 are flowcharts showing procedures according to which the ECU 60 performs integrated control of the emitter, the combustor, and the exhaust fan. If the routine is started, a variable k is first set as 0 in step S202. A fuel amount $q_0$ is then determined in step S204 according to an output command regarding a power generation amount (the output command determines a required output). An initial state quantity $f_0$ of the combustor, an initial state quantity $e_0$ of the emitter, and an initial state quantity $h_0$ of the exhaust fan are determined in step S204 as well. It is to be noted herein that each of the initial state quantities $f_0$, $e_0$, and $h_0$ assumes a value slightly smaller than a target value corresponding to the output command.

The fuel amount q representing an amount of actually supplied fuel is then controlled so as to have an error smaller than a predetermined value $\Delta q_0$. That is, the fuel gas flow rate meter 70 measures a fuel amount q in step S206. An error in the fuel amount is then calculated in step S208 according to a formula $\Delta q \leftarrow q_0 - q$. It is then determined in step S210 whether or not a relation $|\Delta q| < \Delta q_0$ has been established. If this relation has not been established, the fuel amount is increased or reduced by $(\frac{1}{2})\Delta q$ in step S212, and the processing in step S206 is then performed again. On the other hand, if the relation $|\Delta q| < \Delta q_0$ has been established, the processing in step S214 is performed.

An exhaust gas temperature $t_k$ and a power generation amount $W_k$ are then measured to check whether or not the present operational state is permissible with respect to a power generation amount during desired or optimal control. More specifically, the exhaust gas temperature sensor 74 first measures an exhaust gas temperature $t_k$ in step S214. A power generation amount $W_k$ is then measured in step S216 on the basis of an output from the current meter 72. An error $\Delta W_k$ in the power generation amount is then calculated in step S218 according to a formula $\Delta W_k \leftarrow W_0 - W_k$. As is apparent from FIG. 9, a power generation amount $W_0$ during optimal control is determined in accordance with the fuel amount.

Figure 9:
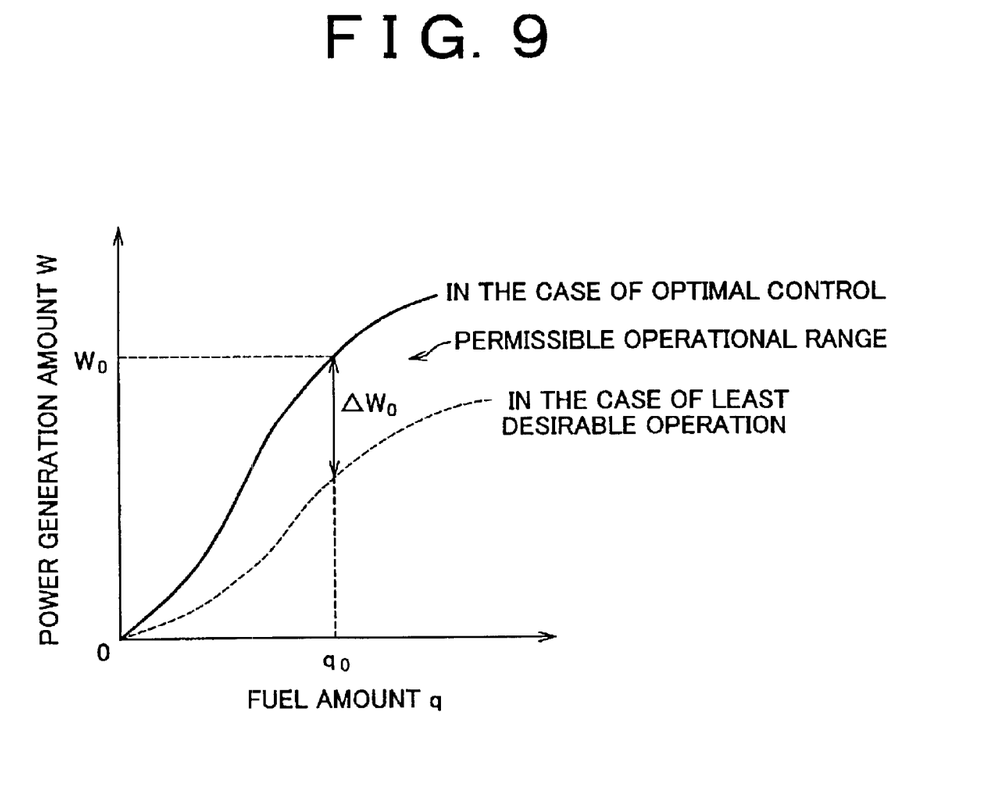
FIG. 9 is a characteristic diagram showing a relation between fuel amount and power generation amount in the photothermal power generation device according to the embodiment of the invention.

It is then determined in step S220 whether or not an error $\Delta W_k$ in the power generation amount is smaller than a permissible value $\Delta W_0$ shown in FIG. 9. If $\Delta W_k \geq \Delta W_0$, the exhaust gas temperature $t_k$ is compared with a predetermined value to in step S222. If $t_k < t_0$, namely, if exhaust gas is at a low temperature while a sufficient output cannot be obtained, the device is regarded as failing to function properly and thus is stopped (step S224). On the other hand, if $t_k \geq t_0$, the processing in step S214 is performed again.

If it is determined in step S220 that $\Delta W_k < \Delta W_0$, namely, that the present operational state is in a permissible range, the variable k is incremented in step S226. A transition to optimizing control of the emitter, the exhaust fan, and the combustor is made thereafter. It is determined in step S228 whether or not k is a multiple of three. If k is a multiple of three, a later-described emitter control routine is executed in step S230. It is then determined in step S232 whether or not k is a multiple of ten. If k is a multiple of ten, a later-described exhaust fan control routine is executed in step S234.

A later-described combustor control routine is then executed in step S236. While the combustor control routine is executed every time, the emitter control routine and the exhaust fan control routine are executed at intervals of a certain period. This is because the response delay time differs among combustor control, emitter control, and exhaust fan control. Finally, it is determined in step S238 whether or not the output command has been shifted from a previously received value. If the output command has not been shifted, the processing in step S206 is performed again. If the output command has been shifted, the processing in step S202 is performed again.

Figure 10:
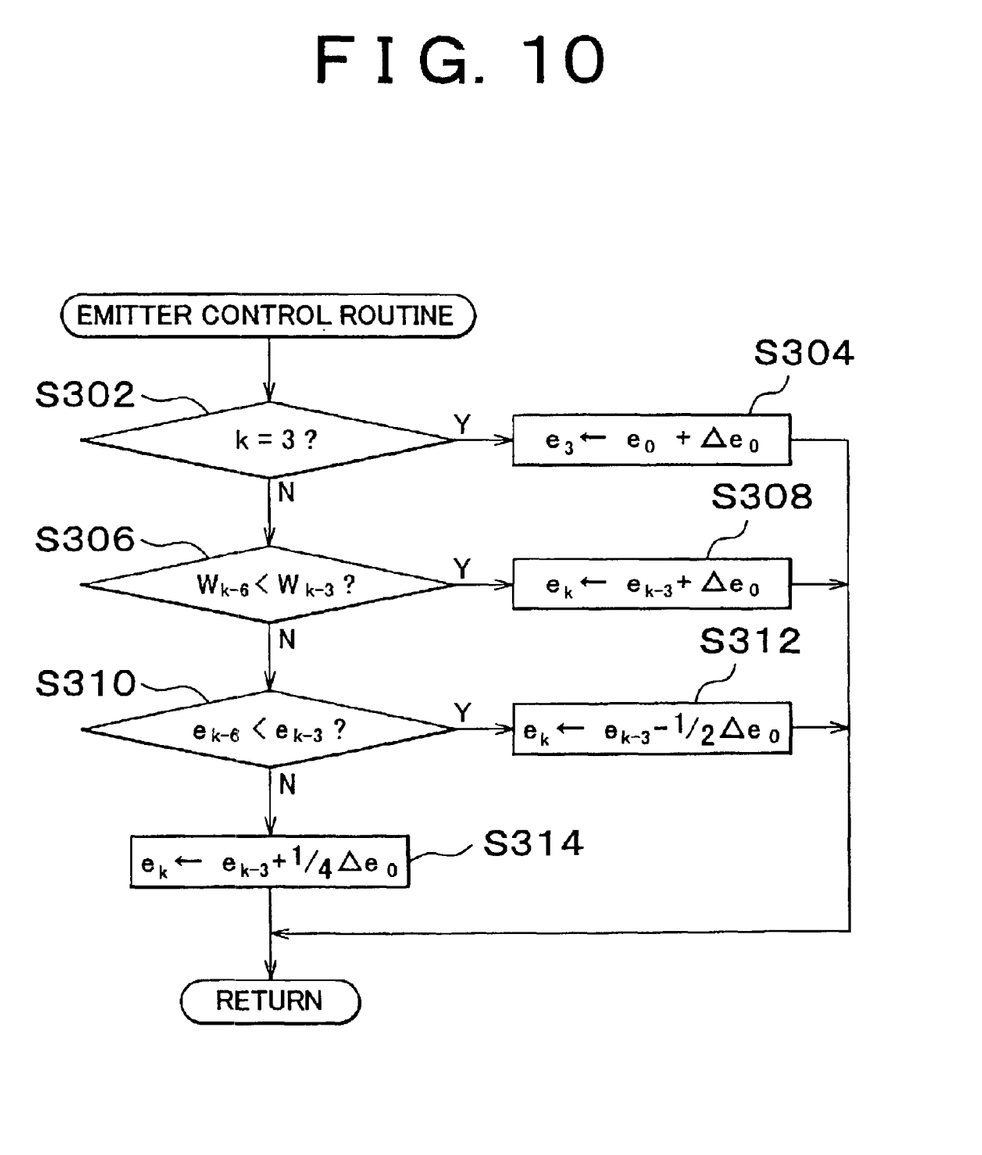
FIG. 10 is a flowchart showing processing procedures in an emitter control routine of the photothermal power generation device according to the embodiment of the invention.

FIG. 10 is a flowchart showing processing procedures of the emitter control routine executed in step S230. First of all, it is determined in step S302 whether or not k=3. If k=3, the initial state quantity $e_0$ of the emitter is set as a relatively small value. Thus, a predetermined reference incremental value $\Delta e_0$ is added to $e_0$ in step S304, so that a new state quantity $e_3$ of the emitter 34 is determined. The present routine is then terminated.

On the other hand, if it is determined in step S302 that $k \neq 3$, namely, that k=6, 9, . . . , a second last power generation amount $W_{k-6}$ and a last power generation amount $W_{k-3}$ are compared with each other in step S306. If it is determined that $W_{k-6} < W_{k-3}$, namely, that the power generation amount has been increased, a new state quantity $e_k$ is determined in step S308 by adding the predetermined reference incremental value $\Delta e_0$ to $e_{k-3}$. The present routine is then terminated.

If it is determined in step S306 that $W_{k-3} \leq W_{k-6}$, namely, that the power generation amount has been reduced, a comparison of $e_{k-6}$ and $e_{k-3}$ is made in step S310 to determine whether a last state quantity has been increased or reduced. If $e_{k-6} < e_{k-3}$, namely, if the last state quantity has been increased, a new state quantity $e_k$ is determined in step S312 by adding $(-\frac{1}{2})\Delta e_0$ to $e_{k-3}$. The present routine is then terminated.

On the other hand, if it is determined in step S310 that $e_{k-3} \leq e_{k-6}$, namely, that the last state quantity has been reduced, a new state quantity $e_k$ is determined in step S314 by adding $(\frac{1}{4})\Delta e_0$ to $e_{k-3}$. The present routine is then terminated. By performing such processings repeatedly, the state quantity of the emitter is optimized.

By performing integrated control of the emitter, the combustor, and the exhaust fan as described above, the emitter is heated uniformly. Accordingly, it becomes possible to maximize the power generation efficiency.

As described hereinbefore, the photothermal power generation device of the invention ensures a uniform light-emitting intensity in the emitter and thus achieves enhancement of the power generation efficiency.

While the invention has been described with reference to the presently preferred embodiments thereof, it is to be understood that the invention is not limited to the above-described embodiments or constructions. To the contrary, the invention is intended to cover various modifications and equivalent arrangements. In addition, while the various elements of the presently preferred embodiments are shown in various combinations and configurations, which are exemplary, other combinations and configurations, including more, less, or only a single element, are also within the spirit and scope of the invention.

What is claimed is:

1. A photothermal power generation device comprising:
    a combustor for receiving a supply of fuel and air, burning the fuel, and producing a combustion gas;
    an emitter heated by allowing the combustion gas produced in the combustor to flow through a combustion gas flow passage;
    a photoelectric conversion element for receiving light emitted from the emitter and converting the light into electric power; and
    a flow resistance adjusting unit for adjusting a resistance in the combustion gas flow passage of the emitter in accordance with a state of the combustion gas.

2. The photothermal power generation device according to claim 1, wherein
    the emitter comprises a main emitter having a first size and an auxiliary emitter having a second size less than the first size.

3. The photothermal power generation device according to claim 2, wherein
    the flow resistance adjusting unit is configured to adjust the resistance in the combustion gas flow passage by changing a positional relation between the main emitter and the auxiliary emitter.

4. The photothermal power generation device according to claim 1, further comprising:
    a combustor fire vent adjusting unit for adjusting at least one of shapes and a number of, fire vents formed in the combustor, in accordance with a required output of power generation.

5. The photothermal power generation device according to claim 4, further comprising:
    a discharge state adjusting unit for adjusting a discharge state of exhaust gas on the basis of a state of the combustion gas.

6. The photothermal power generation device according to claim 1, further comprising:
    a discharge state adjusting unit for adjusting a discharge state of exhaust gas on the basis of a state of the combustion gas.

7. A photothermal power generation device comprising:
    a combustor for receiving a supply of fuel and air, burning the fuel, and producing a combustion gas;
    an emitter heated by allowing the combustion gas produced in the combustor to flow through a combustion gas flow passage;
    a photoelectric conversion element for receiving light emitted from the emitter and converting the light into electric power; and
    a combustor fire vent adjusting unit for adjusting at least one of shapes and a number of, fire vents formed in the combustor, in accordance with a required output of power generation.

8. The photothermal power generation device according to claim 7, further comprising:
    a discharge state adjusting unit for adjusting a discharge state of exhaust gas on the basis of a state of the combustion gas.

9. A photothermal power generation device comprising:
    a combustor for receiving a supply of fuel and air, burning the fuel, and producing a combustion gas;
    an emitter heated by allowing the combustion gas produced in the combustor to flow through a combustion gas flow passage;
    a photoelectric conversion element for receiving light emitted from the emitter and converting the light into electric power; and
    a discharge state adjusting unit for adjusting a discharge state of exhaust gas on the basis of a state of the combustion gas;
    wherein the discharge state adjusting unit comprises an exhaust fan.

10. The photothermal power generation device according to claim 9, wherein
    the discharge state adjusting unit adjusts the discharge state of exhaust gas by controlling a rotational speed of the exhaust fan.

11. A method of generating photothermal power, comprising the steps of:
    receiving fuel and air in a combustor;
    burning the fuel and producing a combustion gas;
    heating an emitter by flowing the combustion gas through the emitter;
    emitting light from the heated emitter;
    receiving the emitted light in a photoelectric conversion element and converting the light into electric power; and
    adjusting a resistance to flow of the combustion gas in the emitter with a flow resistance adjusting unit.

12. The method of claim 11, further comprising the step of adjusting at least one of shapes or a number of, fire vents in the combustor in accordance with a required power output.

13. The method of claim 11, further comprising a step of adjusting, with a discharge state adjusting unit, a discharge state of exhaust gas in accordance with a state of the combustion gas.

14. The method of claim 13, wherein the step of adjusting a discharge state of exhaust gas further comprises changing a rotational speed of an exhaust fan.

* * * * *